US006998037B2

(12) United States Patent
Corma Canós et al.

(10) Patent No.: US 6,998,037 B2
(45) Date of Patent: *Feb. 14, 2006

(54) USE OF ZEOLITE ITQ-21 IN THE CATALYTIC CRACKING OF ORGANIC COMPOUNDS

(75) Inventors: Avelino Corma Canós, Valencia (ES); María José Díaz Cabañas, Valencia (ES); Luis Joaquín Martinez Triguero, Valencia (ES); Fernando Rey García, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

This patent is subject to a terminal disclaimer.

(21) Appl. No.: 10/817,772

(22) Filed: Apr. 2, 2004

(65) Prior Publication Data

US 2004/0256291 A1  Dec. 23, 2004

Related U.S. Application Data

(63) Continuation of application No. PCT/ES02/00469, filed on Oct. 4, 2002.

(30) Foreign Application Priority Data

Oct. 4, 2001 (ES) ................................ 200102287

(51) Int. Cl.
 *C10G 11/05* (2006.01)
(52) U.S. Cl. ................. 208/120.01; 208/113; 208/114; 208/118
(58) Field of Classification Search ........... 208/120.01, 208/113, 114, 118
 See application file for complete search history.

(56) References Cited

U.S. PATENT DOCUMENTS

| | | | |
|---|---|---|---|
| 3,758,403 A | 9/1973 | Rosinski et al. | |
| 3,769,202 A | 10/1973 | Plank et al. | |
| 3,894,931 A | 7/1975 | Nace et al. | |
| 3,894,933 A | 7/1975 | Owen et al. | |
| 3,894,934 A | 7/1975 | Owen et al. | |
| 3,926,782 A | 12/1975 | Plank et al. | |
| 4,137,152 A | 1/1979 | Chester et al. | |
| 4,309,279 A | 1/1982 | Chester et al. | |
| 4,309,280 A | 1/1982 | Rosinski et al. | |
| 4,375,458 A | 3/1983 | Dwyer et al. | |
| 4,740,292 A | 4/1988 | Chen et al. | |
| 5,314,612 A | 5/1994 | Eberly et al. | |
| 6,849,248 B1 * | 2/2005 | Corma Canos et al. | ..... 423/718 |

FOREIGN PATENT DOCUMENTS

| | | |
|---|---|---|
| EP | 0350331 A1 | 1/1990 |
| EP | 0489324 A1 | 6/1992 |
| ES | 2192935 | 10/2003 |
| FR | 2661621 | 11/1991 |

OTHER PUBLICATIONS

Marcilly C., Studies in Surface Science and Catalysis 135, 37 (2001).
Weirauch, Hydrocarbon Processing, vol. 80, No. 6, p. 23 (2001).
Buchanan et al., Applied Catalysis A: General, 134, 247 (1996).
Madon, R.J., Journal of Catalysis 129 (1), 275 (1991).
Magee et al., Studies in Surface Science and Catalysis, vol. 76, 499 (1993).
Avelino Corma et al., J. Catal. 165, 102 (1997).
Jacquinot et al., Stud. Surf. Sci. and Catal. 46, 115 (1989).

* cited by examiner

*Primary Examiner*—Walter D. Griffin
(74) *Attorney, Agent, or Firm*—Klauber & Jackson

(57) ABSTRACT

The present invention relates to the use of zeolite ITQ-21 in a process of catalytic cracking of organic compounds. In said cracking process the zeolite ITQ-21 can be present in the catalyst as the sole zeolite component of same of combined with at least one second zeolite component. Moreover, said zeolite ITQ-21 can be present in the catalyst as unmodified zeolite ITQ-21 or as ITQ-21 modified zeolite. The preferred combinations, wherein the zeolite forms part of the cracking catalyst, are those wherein it is combined with at least one second zeolite component. The preferred modifications comprise, for example, a modification by means of post-synthesis treatment with phosphorous or a modification involving the introduction of acid centres. The catalytic process is preferably an FCC or DPC type hydrocarbon cracking process.

14 Claims, 1 Drawing Sheet

USE OF ZEOLITE ITQ-21 IN THE CATALYTIC CRACKING OF ORGANIC COMPOUNDS

RELATED APPLICATIONS

The present application is a Continuation of co-pending PCT Application Ser. No. PCT/ES02/00469, filed Oct. 4, 2002, which in turn, claims priority from Spanish Application Ser. No. P200102287, filed Oct. 4, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD

Catalytic cracking catalysts.

BACKGROUND

There is currently an ever-increasing demand for light olefins in the petrochemical industry (Marcilly C., Studies in Surface Science and Catalysis 135, 37 (2001); Hydrocarbon Processing, Vol. 80, No. 6, p. 23 (2001)). Together with steam cracking, Fluid Catalytic Cracking (FCC) or its variant, Deep Catalytic Cracking (DCC), are the processes most used in the production of C3–C5 olefins. In particular, catalytic cracking produces large amounts of propylene, one of the olefins in greatest demand. Furthermore, FCC provides approximately 30% of the gasoline stream in a refinery, and at the present time when there is surplus global production of gasoline, particularly in Europe, the FCC unit's selectivity for propylene can be increased, optimizing the economic yield of the unit.

The amount of propylene produced by FCC may be increased by modifying the working conditions of the unit, for example by increasing the temperature of the reactor. However, this solution entails a considerable increase in gases, in particular in unwanted dry gas. Better results are obtained using novel catalyst compositions that involve the use of zeolite mixtures. The use of zeolite ZSM-5 as an additive in FCC catalysts also results in an increase in C3 and C4 olefins (see, for example, U.S. Pat. Nos. 3,758,403; 3,769,202; 3,894,931; 3,894,933; 3,894,934; 3,926,782; 4,309,280; 4,309,279; 4,375,458; and Buchanan, J. S. and Adewuyi, Y. G., Applied Catalysis A: General, 134, 247 (1996); Madon, R. J., Journal of Catalysis 129 (1), 275 (1991)). However, it is known (Studies in Surface Science and Catalysis, Vol. 76, 499 (1993)) that the introduction of zeolite ZSM-5 has little or no effect on the total conversion.

Both from the point of view of increasing the barrel octane number of the gasoline and of increasing the yield of C3–C4 olefins, particularly of propylene, it would be advantageous to find other zeolites that also make it possible to convert feed. Many medium- and large-pore zeolites have been studied for this purpose. Mention can be made of the use of zeolite MCM-22, Omega, L, mordenite and BEA (see, for example: J. Catal. 165, 102 (1997); Stud. Surf. Sci. and Catal. 46, 115 (1989); U.S. Pat. No. 5,314,612; EP-489 324; U.S. Pat. Nos. 4,740,292; 4,137,152; EP-350 331; FR-2 661 621).

Spanish patent application P200101145 discloses a novel zeolite, called ITQ-21, whose structure is defined by a characteristic X-ray diffractogram, as an active zeolite component for cracking organic compounds, more specifically petroleum-derived hydrocarbon fractions or synthetic fractions. The relative intensities, widths, and positions of the diffraction peaks can change depending on the chemical composition of the material, and on the degree of hydration and the size of the zeolite crystal.

However, the potential of zeolite ITQ-21 as a catalyst in processes for cracking and converting organic compounds has not been developed to date, and it forms the subject of the present invention.

It will be shown that the pore topology of this zeolite confers on it activity for cracking catalytic cracking unit feeds, and for obtaining, alone and/or in combination with other zeolites, a good octane number of the gasoline produced and a good yield of olefins, especially of propylene.

DESCRIPTION OF THE INVENTION

Figure 1:
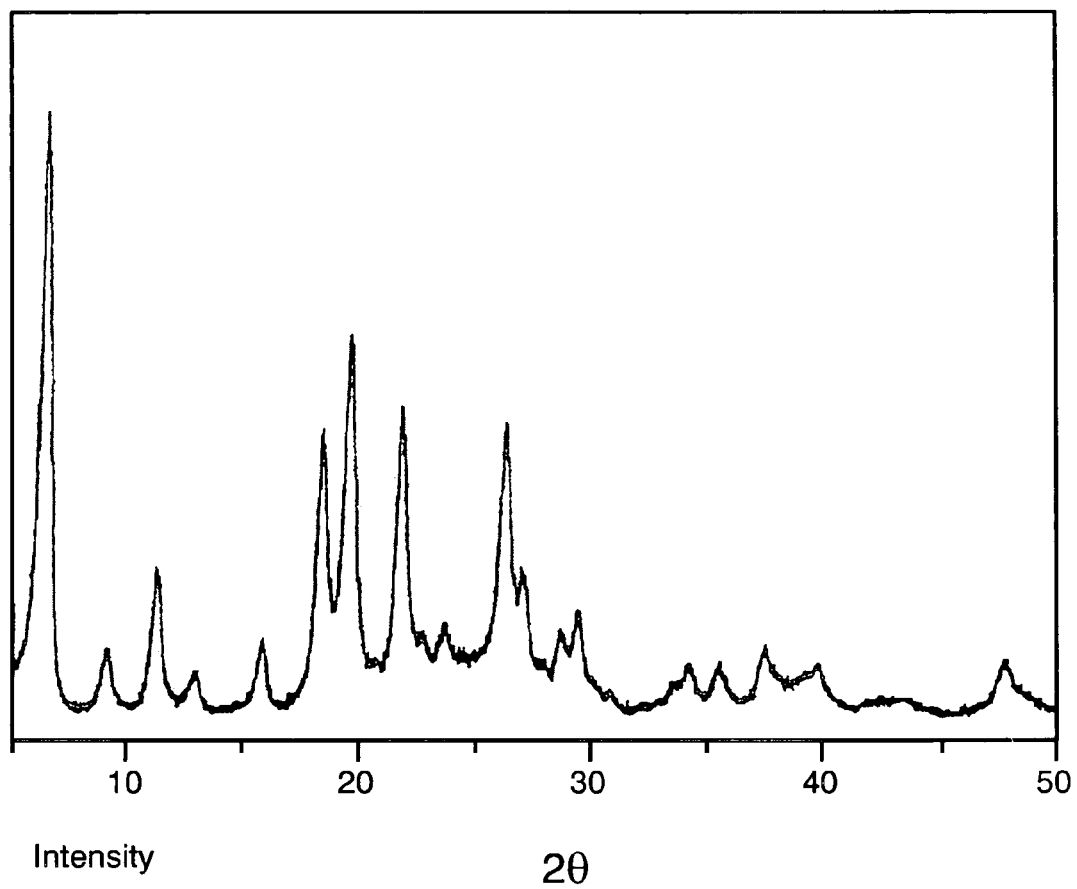
FIG. 1 shows the X-ray diffraction pattern of uncalcined zeolite ITQ-21, as prepared in Example 1.

The present invention relates to the use of zeolite ITQ-21 in a process of catalytic cracking of organic compounds. In said cracking process, the zeolite ITQ-21 can be present in the catalyst as the sole zeolite component of same or combined with at least one second zeolite component. Moreover, said zeolite ITQ-21 can be present in the catalyst as unmodified zeolite ITQ-21 or as modified zeolite ITQ-21.

Zeolite ITQ-21, as described in Spanish patent application P200101145 has a chemical composition represented by:

$$X_2O_3 : nYO_2 : mZO_2$$

in which
(n+m) is at least 5,
X is a trivalent element,
Z is Ge,
Y is at least one tetravalent element other than Ge, and the Y/Z ratio is at least 1.

Zeolite ITQ-21 is a large-pore zeolite with a pore diameter greater than 7 Å. This material has a novel structure or topology, characterized by a specific X-ray diffraction pattern. The main peaks in the diffractogram of zeolite ITQ-21 as synthesized, that differentiate it from the other known zeolites, are shown in Table 1.

TABLE 1

Uncalcined zeolite ITQ-21

| 2θ (°)[a] | d (Å) | $I_{rel}$[b] |
|---|---|---|
| 6.5 | 13.64 | VS |
| 11.5 | 7.73 | M |
| 18.5 | 4.80 | S |
| 19.6 | 4.53 | VS |
| 21.8 | 4.08 | S |
| 26.2 | 3.40 | VS |
| 29.3 | 3.05 | M |

[a]±0.3
[b]Relative intensity, the most intense peak being assigned a value of 100; W (weak) corresponds to a value of less than 20, M (medium) between 20 and 40, S (strong) between 40 and 60, and VS (very strong) greater than 60.

Once calcined, the crystal structure of zeolite ITQ-21 is characterized by an X-ray diffraction pattern whose most characteristic lines are shown in Table 2.

TABLE 2

| | Calcined zeolite ITQ-21 | |
|---|---|---|
| 2θ (°)[a] | d (Å) | $I_{rel}$ |
| 6.4 | 13.76 | VS |
| 11.2 | 7.88 | M |
| 18.4 | 4.81 | W |
| 19.6 | 4.53 | W |
| 21.6 | 4.11 | M |
| 26.3 | 3.39 | M |
| 29.3 | 3.04 | W |

[a] ±0.3

Zeolite ITQ-21 can be synthesized in fluoride medium or in OH⁻ medium, using an organic structure-directing agent, such as the N-methylsparteinium cation, and forming a gel whose composition includes the source of one, and preferably more than one, $T^{IV}$ element, among which Si and Ge are preferred, and of one or more $T^{III}$ elements, among which Al, B and Ga are preferred, the $T^{IV}/T^{III}$ ratio being greater than 10. The synthesized zeolite is calcined at between 350 and 700° C. so that, directly or via conventional ion exchanges, including exchanges with rare earths, the acid form is obtained, this being the preferred form for zeolite ITQ-21 according to the subject of the invention.

In a particular embodiment of the invention, zeolite ITQ-21 is present in the cracking catalyst as the sole component of same.

In an alternative embodiment of the invention, zeolite ITQ-21 is present in the catalyst combined with at least one second component. Said second component is, in a preferred embodiment, a zeolite component. Thus, for example, it can be combined with one or more of those selected from among zeolite components formed of zeolite structures containing pores delimited by 14-membered rings, zeolite components formed of structures containing 12-membered rings, zeolite components formed of structures containing 11-membered rings, zeolite components formed of structures containing 10-membered rings, and mixtures thereof.

Zeolite components formed of zeolite structures containing pores delimited by 14-membered rings include CIT-5 and UTD-1; zeolite components with pore structures delimited by 12-membered rings include, for example, zeolite Beta, ITQ-7, zeolite Y and SSZ-33; zeolite components with pore structures delimited by 11-membered rings include, for example, NU-86; and zeolite components with pore structures delimited by 10-membered rings include, for example, ZSM-5, SAPO-11 and MCM-22.

One aspect of the present invention also envisions the possibility of the cracking catalyst comprising a physical mixture of separate particles.

In a particular embodiment, said physical mixture of separate particles is composed solely of particles containing zeolite ITQ-21.

In another particular embodiment, when the cracking catalyst comprises zeolite ITQ-21 combined with at least one second component, and it is also composed of a physical mixture of particles, said second component may be physically present in the catalyst in the same particle as the zeolite ITQ-21 or, alternatively, said second component may be physically present in the catalyst in a different particle than the zeolite ITQ-21.

In a preferred embodiment, when the catalyst comprises zeolite ITQ-21 and at least one second component, said second component is selected from among zeolite Y, Beta and ZSM-5, said second component being in separate particles from those containing ITQ-21 and being present in the catalyst in a proportion of between 2 and 80% by weight, with respect to the zeolite ITQ-21.

The subject of the present invention is also the use of zeolite ITQ-21, as sole or combined component, in a cracking catalyst, as modified zeolite.

A preferred modification of zeolite ITQ-21 is post-synthesis treatment with phosphorus.

During said post-synthesis treatment with phosphorus, the amount of phosphorus added is preferably between 0 and 8% by weight with respect to the zeolite ITQ-21.

During said post-synthesis treatment with phosphorus, the phosphorus may be incorporated by impregnation with a phosphorus compound selected from among $H_3PO_3$, $H_3PO_4$, $(NH_4)_3PO_4$, $(NH_4)_2HPO_4$, $(NH_4)H_2PO_4$, one of the salts thereof, and mixtures thereof.

By means of said phosphorus-incorporating post-synthesis treatment, a product is obtained that is calcined at a temperature of between 350 and 700° C.

Furthermore, the post-synthesis treatment with phosphorus can be carried out on isolated zeolite ITQ-21, or on zeolite ITQ-21 incorporated in the catalyst with the rest of the components.

According to another aspect of the present invention, the zeolite ITQ-21 has acid centers, and may be formed of at least one $T^{IV}$ element, preferably two $T^{IV}$ elements, among which Si and Ge are preferred, and at least one $T^{III}$ element, among which Al, B, Fe and Ga are preferred. In its initial composition, the molar ratio between $T^{IV}$ and $T^{III}$ may be between 10 and 10 000, and preferably between 15 and 1000.

The zeolite ITQ-21 may be present in the cracking catalyst as zeolite modified via total or partial ion exchange with other ions. Said ions may be selected from among divalent ions, trivalent ions, rare earth cations, and mixtures thereof.

The zeolite ITQ-21 may also be present in the catalyst in protonic form.

According to another aspect of the present invention, the zeolite ITQ-21 may be present in the catalyst incorporated into a matrix. Said matrix may be selected from among: a matrix comprising at least one binder and zeolite ITQ-21 as sole zeolite component; and a matrix comprising at least one binder, zeolite ITQ-21 and at least one second zeolite component, said second zeolite component being selected preferably from among at least one of zeolite Y, zeolite Beta, and ZSM-5.

In addition, the catalyst composition may contain a binder and any other additive(s) conventionally used in FCC catalysts, such as kaolin, alumina-silica, or mixtures thereof.

According to the present invention, the zeolite ITQ-21 may form part, as sole or combined component, of a catalyst in the cracking of hydrocarbon fractions derived from petroleum, or alternatively a catalyst in the cracking of synthetic hydrocarbon fractions.

Preferably, the catalytic cracking process is selected from among Fluid Catalytic Cracking (FCC) and Deep Catalytic Cracking (DCC).

In the case of FCC catalysts containing zeolite ITQ-21, it may also contain other zeolites such as, for example, zeolite Y, Beta and ZSM-5, in the same catalyst particle or in separate particles, the composition of the cracking products in such cases being determined by the combined effect of the various zeolites.

According to a particular embodiment of the present invention, the catalytic process is an FCC catalytic cracking process in which the zeolite ITQ-21 is present as the sole component of the catalyst or as an additive, possibly being present as an additive in an amount preferably between 2 and 60% by weight with respect to the total weight of the catalyst.

Examples illustrating the main body of this invention are given below.

EXAMPLES

Example 1

Synthesis of a Sample of the Zeolite ITQ-21 Component.

0.95 g of germanium oxide is dissolved in 85.70 g of an N-methylsparteinium hydroxide solution at a concentration of 0.58 mol/1000 g. 18.94 g of tetraethylorthosilicate and 0.82 g of aluminum isopropoxide are hydrolyzed in this solution, with stirring being maintained until complete evaporation of the alcohols formed during hydrolysis. Lastly, 2.08 g of hydrofluoric acid (48.1 wt %) are added and the resulting mixture is heated in steel autoclaves with a Teflon internal lining, at 175° C., with stirring, for 7 days.

The final composition of the synthesis gel is:

$$0.91SiO_2:0.09GeO_2:0.02Al_2O_3:0.50C_{16}H_{29}NOH: 0.50HF:3H_2O$$

The X-ray diffraction pattern of powder from the solid obtained after filtering, washing and drying at 100° C. is shown in FIG. 1 and in Table 3.

TABLE 3

| Uncalcined zeolite ITQ-21 | | |
|---|---|---|
| 2θ (°) | d (Å) | $I_{rel}$ |
| 6.48 | 13.64 | 100 |
| 9.30 | 9.50 | 13 |
| 11.45 | 7.73 | 22 |
| 13.01 | 6.80 | 7 |
| 15.90 | 5.57 | 14 |
| 18.48 | 4.80 | 52 |
| 19.59 | 4.53 | 80 |
| 21.76 | 4.08 | 64 |
| 22.64 | 3.92 | 16 |
| 23.56 | 3.77 | 20 |
| 26.17 | 3.40 | 70 |
| 26.99 | 3.30 | 34 |
| 27.78 | 3.21 | 13 |
| 28.55 | 3.12 | 21 |
| 29.25 | 3.05 | 25 |
| 30.88 | 2.89 | 5 |
| 33.61 | 2.66 | 7 |
| 34.11 | 2.63 | 11 |
| 35.47 | 2.53 | 10 |
| 37.31 | 2.41 | 12 |

Example 2

Activation by Calcination of the Zeolite ITQ-21 Component.

The zeolite obtained in Example 1 is calcined in air at 550° C. for 3 hours. The X-ray diffraction pattern of the calcined material is shown in Table 4.

TABLE 4

| Calcined zeolite ITQ-21 | | |
|---|---|---|
| 2θ (°) | d (Å) | $I_{rel}$ |
| 6.43 | 13.73 | 100 |
| 9.21 | 9.59 | 2 |
| 11.23 | 7.87 | 31 |
| 13.07 | 6.77 | 2 |
| 15.90 | 5.57 | 14 |
| 18.43 | 4.81 | 12 |
| 19.59 | 4.53 | 18 |
| 21.66 | 4.10 | 20 |
| 22.62 | 3.93 | 6 |
| 23.70 | 3.75 | 6 |
| 26.25 | 3.39 | 20 |
| 26.96 | 3.30 | 12 |
| 28.47 | 3.13 | 5 |
| 29.33 | 3.04 | 29 |
| 30.84 | 2.90 | 2 |
| 33.45 | 2.68 | 3 |
| 34.25 | 2.62 | 4 |
| 35.29 | 2.54 | 2 |
| 37.20 | 2.41 | 3 |

Example 3

Catalytic Cracking of a Vacuum Gasoil with a Catalyst Containing ITQ-21.

In this example, a primer catalyst, Catalyst A, was prepared using the zeolite of Example 1 that, after being calcined at 550° C. for 5 hours in air, was dispersed (0.50 g) in silica (2.50 g) and the mixture, well homogenized, was pelletized, ground in a mortar, and screened, with the fraction between 0.59 and 0.84 mm in diameter being retained.

The reaction of catalytic cracking of vacuum gasoil (Table 5) with this catalyst was performed in a "Microactivity Test" (MAT) fixed bed reactor at 500° C., with a feed time of 60 seconds, and various catalyst/feed ratios expressed as weight of zeolite/weight of feed. Table 6 shows the yields interpolated at 70% of total conversion, defined as the sum of the gasoline, diesel (LCO), gases and coke yields. The yield of propylene and the other products is also shown in comparison to the constant gases yield (interpolated at 25% of the gases yield) in Table 7. These tables provide a comparison of the results of the catalytic cracking of vacuum gasoil obtained using a commercial USY zeolite (Zeolyst CBV720), which we shall call zeolite USY-1, with a unit cell of 24.28 Å (Catalyst B), and with a commercial zeolite Beta (Zeolyst CP806-BL25) with an Si/Al ratio of 13 (Catalyst C). Catalysts B and C were prepared from commercial zeolites by mixing them with silica and shaping them in the same way as for Catalyst A. The results show that Catalyst A, with the zeolite whose use is claimed in this patent, is more active and produces a higher amount of propylene both at constant conversion (Table 6) and within the gases fraction (Table 7).

TABLE 5

| Properties of the vacuum gasoil | |
|---|---|
| Density (15° C.) g cc$^{-1}$ | 0.9172 |
| Aniline point (° C.) | 79.2 |
| Sulfur (wt %) | 1.65 |
| Nitrogen (ppm) | 1261 |
| Na (ppm) | 0.18 |

TABLE 5-continued

Properties of the vacuum gasoil

| | |
|---|---|
| Cu (ppm) | <0.1 |
| Fe (ppm) | 0.30 |
| Ni (ppm) | 0.2 |
| V (ppm) | 0.40 |
| ASTM D-1160 (° C.) | |
| 5% | 319 |
| 10% | 352 |
| 30% | 414 |
| 50% | 436 |
| 70% | 459 |
| 90% | 512 |
| VABP (° C.) | 435 |
| K (UOP) | 11.82 |
| Average molecular weight | 407 |
| Aromatic carbon (wt %) | 22.96 |
| Naphthenic carbon (wt %) | 15.16 |
| Paraffinic carbon (wt %) | 61.88 |

TABLE 6

Comparison of activity and selectivity at constant conversion.

| Zeolite | Catalyst A ITQ-21 | Catalyst B USY-1 | Catalyst C Beta |
|---|---|---|---|
| Conversion (%) | 70 | 70 | 70 |
| CAT/OIL[a] | 0.31 | 0.38 | 0.59 |
| Yields (%) | | | |
| Gasoline | 30.5 | 39.3 | 27.4 |
| Diesel | 12.5 | 13.3 | 8.7 |
| Gases | 24.2 | 15.1 | 29.1 |
| Coke | 2.8 | 2.3 | 4.8 |
| Hydrogen | 0.10 | 0.07 | 0.16 |
| Methane | 0.52 | 0.33 | 0.61 |
| Ethane | 0.75 | 0.45 | 0.92 |
| Ethylene | 1.21 | 0.78 | 1.56 |
| Propane | 2.38 | 1.08 | 3.24 |
| Propylene | 5.95 | 3.52 | 5.85 |
| Isobutane | 6.77 | 3.97 | 6.03 |
| n-Butane | 1.22 | 0.81 | 1.72 |
| T2-Butene | 1.17 | 1.06 | 1.83 |
| 1-Butene | 1.17 | 1.01 | 1.74 |
| Isobutene | 1.93 | 1.18 | 3.59 |
| C2-Butene | 0.98 | 0.85 | 1.52 |

[a]CAT/OIL: catalyst/feed ratio (g/g)

TABLE 7

Comparison of activity and selectivity at constant gases yield

| Zeolite | Catalyst A ITQ-21 | Catalyst B USY-1 | Catalyst C Beta |
|---|---|---|---|
| C1–C4 gases yield (%) | 25 | 25 | 25 |
| CAT/OIL | 0.34 | 0.72 | 0.54 |
| Conversion (%) | 71.7 | 86.5 | 64.2 |
| Yields (%) | | | |
| Gasoline | 31.4 | 45.7 | 26.2 |
| Diesel | 12.4 | 11.0 | 9.3 |
| Coke | 3.0 | 4.8 | 3.7 |
| Hydrogen | 0.11 | 0.13 | 0.13 |
| Methane | 0.56 | 0.56 | 0.52 |
| Ethane | 0.81 | 0.78 | 0.77 |
| Ethylene | 1.27 | 1.38 | 1.29 |
| Propane | 2.53 | 2.14 | 2.78 |
| Propylene | 5.98 | 5.39 | 5.52 |
| Isobutane | 7.11 | 7.35 | 4.90 |

TABLE 7-continued

Comparison of activity and selectivity at constant gases yield

| Zeolite | Catalyst A ITQ-21 | Catalyst B USY-1 | Catalyst C Beta |
|---|---|---|---|
| n-Butane | 1.31 | 1.62 | 1.39 |
| T2-Butene | 1.19 | 1.57 | 1.61 |
| 1-Butene | 1.19 | 1.43 | 1.54 |
| Isobutene | 1.93 | 1.37 | 3.21 |
| C2-Butene | 1.00 | 1.27 | 1.34 |

Example 4

Catalytic Cracking of a Vacuum Gasoil with a Catalyst Containing ITQ-21 Deactivated in the Presence of $H_2O$ Vapor.

The zeolite that is the subject of this patent was treated, in pure, powdered form, in a 100% $H_2O$ vapor atmosphere at 720° C. for 5 hours, maintaining a BET specific surface area of 280 $m^2g^{-1}$. One gram of zeolite treated with vapor was combined with 2 grams of silica as described in Example 3, to form Catalyst D. Another catalyst (Catalyst E) was also prepared by mixing 1 g of a USY zeolite, which we shall call USY-2, with 2 g of silica and giving it the same particle size as the earlier catalysts. The zeolite USY-2, with a unit cell of 2.425 nm, has a BET specific surface area of 291 $m^2g^{-1}$. The results of the gasoil catalytic cracking, as described in Example 3, are shown in Tables 8 and 9. These results show that the catalytic properties of zeolite ITQ-21 are still present after the treatment with vapor, giving a high propylene yield when both the yields at constant conversion (Table 8) and within the gases fraction (Table 9) are compared.

TABLE 8

Comparison of activity and selectivity at constant conversion.

| Zeolite | Catalyst D Vapor ITQ-21 | Catalyst E USY-2 |
|---|---|---|
| Conversion (%) | 65 | 65 |
| CAT/OIL | 1.30 | 1.40 |
| Yields (%) | | |
| Gasoline | 30.8 | 32.8 |
| Diesel | 13.1 | 14.8 |
| Gases | 17.9 | 14.1 |
| Coke | 3.2 | 3.3 |
| Hydrogen | 0.11 | 0.12 |
| Methane | 0.57 | 0.63 |
| Ethane | 0.83 | 0.98 |
| Ethylene | 1.15 | 1.23 |
| Propane | 1.11 | 0.90 |
| Propylene | 4.79 | 3.64 |
| Isobutane | 2.98 | 1.50 |
| n-Butane | 0.69 | 0.46 |
| T2-Butene | 1.31 | 1.09 |
| 1-Butene | 1.24 | 1.09 |
| Isobutene | 2.04 | 1.59 |
| C2-Butene | 1.04 | 0.87 |

TABLE 9

Comparison of activity and selectivity at constant gases yield.

| Zeolite | Catalyst D<br>Vapor ITQ-21 | Catalyst E<br>USY-2 |
|---|---|---|
| C1–C4 gases yield (%) | 15 | 15 |
| CAT/OIL | 1.09 | 1.49 |
| Conversion (%) | 59.58 | 67.07 |
| Yields (%) | | |
| Gasoline | 28.63 | 33.80 |
| Diesel | 13.28 | 14.79 |
| Coke | 2.66 | 3.48 |
| Hydrogen | 0.09 | 0.12 |
| Methane | 0.51 | 0.66 |
| Ethane | 0.76 | 1.02 |
| Ethylene | 1.01 | 1.28 |
| Propane | 0.98 | 0.94 |
| Propylene | 3.97 | 3.87 |
| Isobutane | 2.41 | 1.60 |
| n-Butane | 0.59 | 0.49 |
| T2-Butene | 1.07 | 1.18 |
| 1-Butene | 1.04 | 1.18 |
| Isobutene | 1.73 | 1.72 |
| C2-Butene | 0.86 | 0.94 |

Example 5

Catalytic Cracking of a Vacuum Gasoil with ITQ-21 and Using a Mixture of Zeolites USY and ZSM-5

This example provides a comparison between the activity and selectivity in cracking a vacuum gasoil (Table 5) of the zeolite that is the subject of this patents as described in Example 3 (Catalyst F), and of a mixture of the zeolite USY-1 referred to in Example 3 and a zeolite ZSM-5 with an Si/Al ratio of 40 (Zeolyst CBV8020), with a zeolite USY-1/zeolite ZSM-5 ratio of 1:0.2 by weight (Catalyst G). The reaction was performed at 520° C. for 30 seconds.

The results obtained (Tables 10 and 11) show that Catalyst F, based on the zeolite that is the subject of this patent, produces a higher amount of propylene than Catalyst G formed of the combination of zeolite USY-1 (24.28 Å) and a zeolite ZSM-5.

TABLE 10

Comparison of activity and selectivity at constant conversion.

| Zeolite | Catalyst F<br>ITQ-21 | Catalyst G<br>USY-1 + ZSM-5 |
|---|---|---|
| Conversion (%) | 70 | 70 |
| CAT/OIL | 0.36 | 0.48 |
| Yields (%) | | |
| Gasoline | 30.17 | 32.88 |
| Diesel | 11.69 | 11.53 |
| Gases | 24.91 | 23.02 |
| Coke | 3.23 | 2.56 |
| Hydrogen | 0.09 | 0.05 |
| Methane | 0.60 | 0.39 |
| Ethane | 0.83 | 0.52 |
| Ethylene | 1.45 | 0.213 |
| Propane | 2.36 | 2.62 |
| Propylene | 6.29 | 5.82 |
| Isobutane | 6.07 | 4.53 |
| n-Butane | 1.20 | 1.53 |
| T2-Butene | 1.30 | 1.12 |
| 1-Butene | 1.30 | 1.12 |
| Isobutene | 2.17 | 2.24 |
| C2-Butene | 1.10 | 0.94 |

TABLE 11

Comparison of activity and selectivity at constant gases yield.

| Zeolite | Catalyst F<br>ITQ-21 | Catalyst G<br>USY-1 + ZSM-5 |
|---|---|---|
| C1–C4 gases yield (%) | 25 | 25 |
| CAT/OIL | 0.37 | 0.64 |
| Conversion (%) | 70.2 | 72.03 |
| Yields (%) | | |
| Gasoline | 30.3 | 33.31 |
| Diesel | 11.7 | 10.97 |
| Coke | 3.26 | 2.75 |
| Hydrogen | 0.09 | 0.06 |
| Methane | 0.61 | 0.48 |
| Ethane | 0.85 | 0.62 |
| Ethylene | 1.46 | 2.40 |
| Propane | 2.40 | 3.02 |
| Propylene | 6.31 | 6.08 |
| Isobutane | 6.15 | 5.22 |
| n-Butane | 1.23 | 1.71 |
| T2-Butene | 1.31 | 1.13 |
| 1-Butene | 1.31 | 1.12 |
| Isobutene | 2.17 | 2.22 |
| C2-Butene | 1.10 | 0.94 |

Example 6

Quality of the Gasoline Obtained During the Catalytic Cracking of a Vacuum Gasoil Using ITQ-21 as Zeolitic Component This example provides, in Table 12, the PIONA (Paraffins, Isoparaffins, Olefins and Aromatics) analysis of the gasoline obtained during the cracking of the vacuum gasoil in Examples 3 and 4.

TABLE 12

| | Catalyst A | Catalyst B |
|---|---|---|
| Zeolite | ITQ-21 | USY-1 (24.28 Å) |
| Conversion, wt % | 68.0 | 69.1 |
| n-paraffins, wt % | 5.8 | 5.1 |
| i-paraffins, wt % | 13.1 | 20.2 |
| olefins, wt % | 12 | 14.0 |
| Naphthenes, wt % | 12.2 | 13.4 |
| Aromatics, wt % | 56.9 | 47.3 |
| RON | 89.3 | 86.9 |
| MON | 84.5 | 82.4 |

The results clearly show that the catalyst based on zeolite ITQ-21 produces a gasoline with fewer olefins and a higher Research Octane Number (RON) and a higher Motor Octane Number (MON) than the zeolite USY-1 (24.28 Å) (Table 1). Following the treatment with vapor, the gasoline obtained with the catalyst based on zeolite ITQ-21 (Catalyst E) has a higher olefin content, but this content is lower than that of the gasoline produced by the zeolite USY-2 (24.25 Å) (Table 2), the gasoline obtained with the catalyst based on ITQ-21 also having a higher RON and MON.

|  | Catalyst D | Catalyst E |
|---|---|---|
| Zeolite | Vapor ITQ-21 | USY-2 (24.25 Å) |
| Conversion, wt % | 63.4 | 61.2 |
| n-paraffins, wt % | 7.3 | 7.3 |
| i-paraffins, wt % | 14.9 | 15.2 |
| olefins, wt % | 15.9 | 22.6 |
| Naphthenes, wt % | 11.6 | 12.4 |
| Aromatics, wt % | 50.2 | 42.5 |
| RON | 86.4 | 85.7 |
| MON | 82.1 | 81.2 |

The invention claimed is:

1. A process for catalytic cracking of organic compounds, said process comprising the step of contacting said organic compounds with zeolite ITQ-21.

2. The process of claim 1, wherein the zeolite ITQ-21 is present in a catalyst as the sole zeolite component of same or combined with at least one second zeolite component, and in that the zeolite ITQ-21 is present in the catalyst as unmodified zeolite ITQ-21 or as modified zeolite ITQ-21.

3. The process of claim 2, wherein the zeolite ITQ-21 is present in the catalyst as the sole zeolite component of same.

4. The process of claim 2, wherein the zeolite ITQ-21 is present in the catalyst combined with at least one second zeolite component.

5. The process of claim 4, wherein said second zeolite component is one or more of those selected from among zeolite components formed of zeolite structures containing pores delimited by 14-membered rings, zeolite components formed of structures containing 12-membered rings, zeolite components formed of structures containing 11-membered rings, zeolite components formed of structures containing 10-membered rings, and mixtures thereof.

6. The process of claim 5, wherein said second zeolite component is one or more of the group comprising: CIT-5, UTD-1; zeolite Beta, ITQ-7, zeolite Y, SSZ-33, NU-86, ZSM-5, SAPO-11 and MCM-22.

7. The process of claim 2, wherein the zeolite ITQ-21 is present in the catalyst as modified zeolite.

8. The process of claim 2, wherein the zeolite ITQ-21 is present in the catalyst as zeolite modified via a post-synthesis treatment by means of which phosphorus is incorporated.

9. The process of claim 2, wherein the zeolite ITQ-21 is present in the catalyst as zeolite modified via total or partial ion exchange with other ions.

10. The process of claim 2, wherein the zeolite ITQ-21 is present in the catalyst in protonic form.

11. The process of claim 1, wherein said cracking is the cracking of hydrocarbon fractions derived from petroleum, or synthetic fractions.

12. The process of claim 11, wherein said catalytic process is a catalytic cracking process selected from among Fluid Catalytic Cracking (FCC) and Deep Catalytic Cracking (DCC).

13. The process of claim 12, wherein said catalytic process is an FCC catalytic cracking process in which the zeolite ITQ-21 is present as the sole component of the catalyst.

14. The process of claim 12, wherein said catalytic process is an FCC catalytic cracking process in which the zeolite ITQ-21 is present in the catalyst as an additive, in an amount between 2 and 60% by weight with respect to the total weight of the catalyst.

* * * * *